(12) United States Patent
Hasch et al.

(10) Patent No.: US 8,823,583 B2
(45) Date of Patent: Sep. 2, 2014

(54) RADAR SENSOR HAVING TWO OSCILLATORS, TWO I/Q TRANSMIT MIXERS, AND TWO I/Q RECEIVE MIXERS

(75) Inventors: Juergen Hasch, Stuttgart (DE); Andre Manicke, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 13/499,000

(22) PCT Filed: Aug. 2, 2010

(86) PCT No.: PCT/EP2010/061181
§ 371 (c)(1),
(2), (4) Date: Jun. 11, 2012

(87) PCT Pub. No.: WO2011/038955
PCT Pub. Date: Apr. 7, 2011

(65) Prior Publication Data
US 2012/0242538 A1    Sep. 27, 2012

(30) Foreign Application Priority Data
Sep. 30, 2009 (DE) .......................... 10 2009 045 141

(51) Int. Cl.
| | |
|---|---|
| *G01S 13/04* | (2006.01) |
| *G01S 7/02* | (2006.01) |
| *G01S 7/35* | (2006.01) |
| G01S 13/00 | (2006.01) |
| G01S 7/00 | (2006.01) |

(52) U.S. Cl.
USPC ................ 342/194; 342/27; 342/70; 342/82; 342/89; 342/118; 342/128; 342/175

(58) Field of Classification Search
CPC ............ G01S 7/02; G01S 7/28; G01S 7/282; G01S 7/285; G01S 7/288; G01S 7/35; G01S 7/352; G01S 7/40; G01S 13/02; G01S 13/04; G01S 13/06; G01S 13/08; G01S 13/10; G01S 13/18; G01S 13/24; G01S 13/26; G01S 13/28; G01S 13/282; G01S 13/32; G01S 13/93; G01S 13/931
USPC .............. 342/27, 28, 70–72, 73–75, 118, 342/128–133, 175, 192–197, 80, 82, 89, 342/98–103, 134, 137, 147, 149–154, 59, 342/135, 136, 139, 146
See application file for complete search history.

(56) References Cited

U.S. PATENT DOCUMENTS

| | | | | |
|---|---|---|---|---|
| 3,896,436 | A | * | 7/1975 | Johnson .......................... 342/194 |
| 4,136,341 | A | * | 1/1979 | Mulder et al. ................ 342/194 |

(Continued)

FOREIGN PATENT DOCUMENTS

| | | |
|---|---|---|
| CN | 1370347 | 9/2002 |
| CN | 1673770 | 9/2005 |

(Continued)

*Primary Examiner* — Bernarr Gregory
(74) *Attorney, Agent, or Firm* — Kenyon & Kenyon LLP (57) ABSTRACT

A radar sensor for motor vehicles, having a transmitting part, which has two oscillators and a 90° phase shifter for generating a transmission signal, a first comparison signal, and a second comparison signal, which is phase shifted by 90° with respect to the first comparison signal, and a receiving part having an I mixer for mixing a received signal with the first comparison signal and a Q mixer for mixing the received signal with the second comparison signal, in which the transmitting part has a first transmit mixer, whose inputs are directly connected to the two oscillators, and a second transmit mixer, whose one input is directly connected to a first of the two oscillators and whose other input is connected via the phase shifter to the other oscillator.

11 Claims, 5 Drawing Sheets

(56) References Cited

U.S. PATENT DOCUMENTS

| | | | |
|---|---|---|---|
| 4,384,291 A * | 5/1983 | Lewis et al. | 342/196 |
| 5,325,095 A * | 6/1994 | Vadnais et al. | 342/129 |
| 5,568,150 A * | 10/1996 | Taylor et al. | 342/196 |
| 6,028,548 A * | 2/2000 | Farmer | 342/70 |
| 6,646,587 B2 * | 11/2003 | Funai | 342/137 |
| 6,917,327 B2 * | 7/2005 | Jenkins | 342/70 |
| 7,012,561 B2 | 3/2006 | Toennesen et al. | |
| 7,205,931 B2 * | 4/2007 | Gila et al. | 342/129 |
| 7,460,055 B2 * | 12/2008 | Nishijima et al. | 342/70 |

FOREIGN PATENT DOCUMENTS

| | | |
|---|---|---|
| CN | 101049239 | 10/2007 |
| DE | 10 2004 052518 | 5/2006 |
| WO | 2005/098471 | 10/2005 |

* cited by examiner

RADAR SENSOR HAVING TWO OSCILLATORS, TWO I/Q TRANSMIT MIXERS, AND TWO I/Q RECEIVE MIXERS

FIELD OF THE INVENTION

The present invention relates to a radar sensor having a transmitting part, which has two oscillators and a 90° phase shifter for generating a transmission signal, a first comparison signal, and a second comparison signal, which is phase shifted by 90° with respect to the first comparison signal, and a receiving part having an I mixer for mixing a received signal with the first comparison signal and a Q mixer for mixing the received signal with the second comparison signal.

BACKGROUND INFORMATION

Driver assistance systems are increasingly employed in motor vehicles, in which a radar sensor is used for the purpose of locating objects in the surroundings of the vehicle. Depending on the functional principle and intended usage of the radar sensor, it may be necessary to analyze not only the amplitude, but rather also the phase of the received radar signals. For example, a precise knowledge of the phase of the received signal is necessary for a precise distance measurement in the immediate surroundings with the aid of a CW (continuous wave) radar. In the case of an angular resolving radar sensor, for example, an FMCW (frequency modulated continuous wave) radar, having multiple transmitting and receiving channels, an analysis of the phase differences between the various channels allows a more precise angle determination. Using a radar sensor of the above-mentioned type, the phase may be determined from the ratio of the I and Q signals delivered by the two mixers of the receiving part.

For example, this sensor may be a heterodyne sensor, in which one oscillator is used to generate the transmission signal and the other oscillator is used to generate the comparison signals. If an oscillator having a fixed frequency is used to generate the comparison signals, a simple and precise generation of the 90° phase shift may be achieved. However, a disadvantage in the case of this sensor type is that the phase noise of the two oscillators is not correlated, so that relatively complex oscillators having a low phase noise are required.

In contrast thereto, in a homodyne sensor concept, the transmission signal and the two comparison signals are generated by the same oscillator, so that the transmission and comparison signals have a correlated phase noise, which makes it easier to suppress the effects caused by the phase noise during the analysis of the received signals. However, the disadvantage exists here that whether and to what extent the phase shift generated by the phase shifter deviates from the ideal value of 90° may be monitored only with great effort or not at all. Such deviations result in phase errors in the received signal, which may be ascertained and corrected only with great effort or not at all.

SUMMARY OF THE INVENTION

An object of the exemplary embodiments and/or exemplary methods of the present invention is to provide a radar sensor which allows simpler and more precise determination of the phase of the received signal.

This object may be achieved according to the exemplary embodiments and/or exemplary methods of the present invention in that the transmitting part has a first transmit mixer, whose inputs are directly connected to the two oscillators, and a second transmit mixer, whose one input is directly connected to a first of the two oscillators and whose other input is connected via the phase shifter to the other oscillator.

Low-frequency I and Q reference signals may be generated using the two transmit mixers, which may be used to monitor and regulate the phase shifter and/or to reduce the phase noise of one or both oscillators. In addition, in the case of a sensor having a frequency-modulated transmission signal, these reference signals allow simple and precise regulation of the frequency modulation without corruption of the control loop by additional frequency divider chains.

In particular, a precise measurement at close range is thus made possible. The radar sensor is therefore also suitable, for example, for measuring the fuel tank fill level in a motor vehicle or also for applications outside of motor vehicles, for example, for distance measurements in industrial engineering.

Advantageous embodiments and refinements of the present invention are specified herein.

In the case of a homodyne radar, the transmission signal and the first comparison signal may be formed by the sum frequency component of the mixed product of the first transmit mixer (i.e., the frequency component of the mixed product, whose frequency is equal to the sum of the frequencies of the two oscillators), and the second comparison signal may be formed by the sum frequency component of the mixed product of the second transmit mixer. The difference frequency components of the two transmit mixers then form the I and Q reference signals. The function of the phase shifter may then be monitored and optionally regulated with the aid of a phase comparison of these reference signals.

Alternatively or additionally, it is possible for the oscillator, whose signal is supplied to the phase shifter, to use an oscillator having a variable frequency, whose frequency is linked to a fixed reference frequency. Since therefore the frequency of this oscillator is precisely known and additionally the difference frequency of the two oscillators is provided by the frequencies of the I and Q reference signals, the frequency (sum frequency) of the transmission signal generated by the first transmit mixer may also be precisely determined.

Furthermore, the frequency of the I or Q reference signal may be regulated in a phase-locked loop, which activates the associated oscillator, to a modulation frequency, which then determines the frequency modulation of the transmission signal.

In the case of a heterodyne radar, the first oscillator may be used to generate the transmission signal, while the second oscillator generates the two comparison signals. The two transmit mixers then generate I and Q reference signals, whose frequency is lower the smaller the frequency difference between the two oscillators is, and which may be in an intermediate frequency band. The I and Q signals, which are obtained as mixed products of the I and Q mixers, are also in the same intermediate frequency band, and the phase noise of these signals is correlated with the phase noise of the reference signals. By mixing the I and Q reference signals with intermediate frequency signals I and Q, corresponding signals are then obtained in the baseband, from which the phase of the received signal may be determined with high precision.

Angular resolving (homodyne) radar sensors are discussed in DE 10 2004 052 518 A1 and WO 2008/006256 A1, whose multiple transmitting and receiving channels each have a specific frequency offset. Interference effects are thus suppressed, which arise due to interference between the various channels, and, in addition, the analysis of so-called cross echoes is made possible, i.e., the analysis of radar signals which are transmitted in one channel and are received in another channel after reflection on the object.

The radar sensor proposed here, in particular in the homodyne configuration, allows a simple setting of the frequency offsets between the various channels and simple and uniform control of the frequency modulation in these channels.

Exemplary embodiments of the present invention are shown in the drawings and explained in greater detail in the following description.

DETAILED DESCRIPTION

Figure 1:
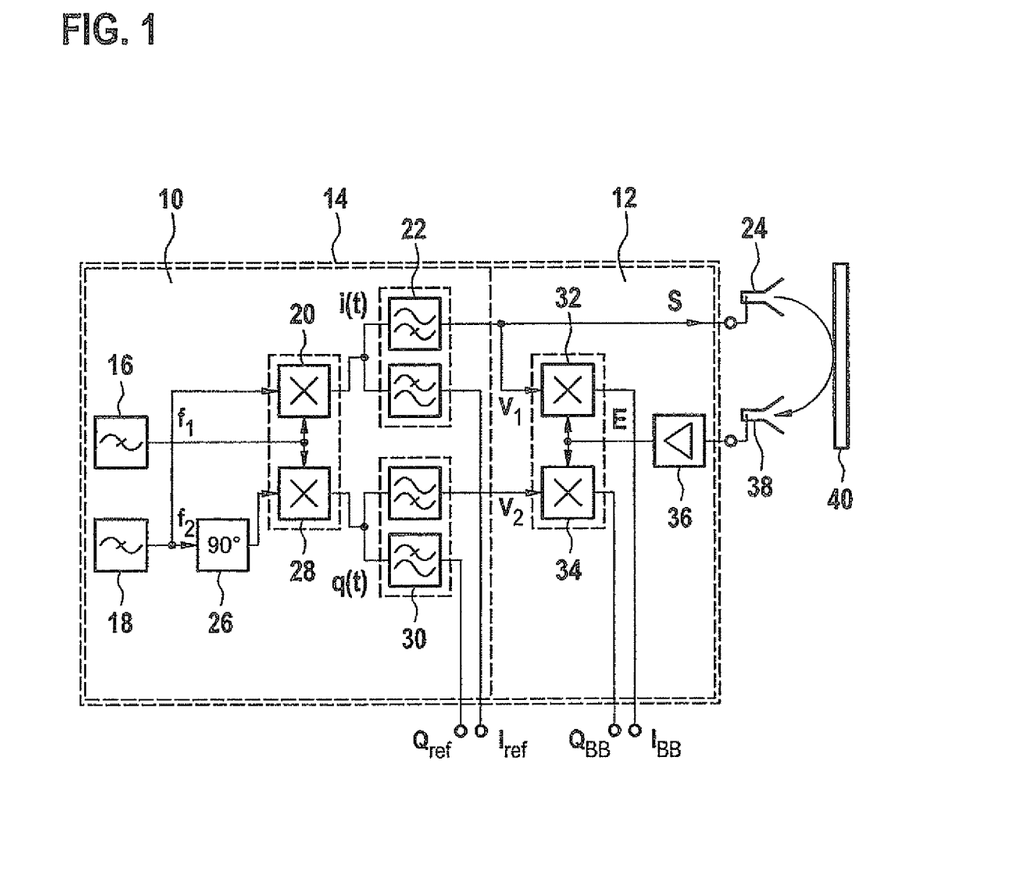
FIG. 1 shows a block diagram of a radar sensor according to the present invention according to a first exemplary embodiment.

The radar sensor shown in FIG. 1 has a transmitting part 10 and a receiving part 12, which may be installed on a shared printed circuit board 14. Transmitting part 10 has a first oscillator 16 and a second oscillator 18, whose oscillation frequency corresponds in each case to approximately half of the desired transmission frequency. For example, at a transmission frequency of 122 GHz, first oscillator 16 has a frequency $f_1$ of 62 GHz and second oscillator 18 has a frequency $f_2$ of 60 GHz. The signals of both oscillators 16, 18 are mixed with one another in a first transmit mixer 20. A signal i(t) of the form of $i(t)=\cos[2\pi(f_1-f_2)t]+\cos[2\pi(f_1+f_2)t]$ is thus obtained at the output of first transmit mixer 20.

The frequency components having sum frequency $(f_1+f_2)$ and difference frequency $(f_1-f_2)$ are separated from one another in a duplex filter 22. A transmission signal S (having sum frequency $(f_1+f_2)$) is thus obtained at the output of a high-pass path of duplex filter 22, which is emitted via an antenna 24.

Transmitting part 10 further contains a phase shifter 26, using which the phase of the signal generated by second oscillator 18 is shifted by 90°. In a second transmit mixer 28, this phase-shifted signal is mixed with the signal of first oscillator 16, and a signal q(t) of the form $q(t)=\sin[2\pi(f_1-f_2)t]+\sin[2\pi(f_1+f_2)t]$ is thus obtained at the output.

In a further duplex filter 30, signal q(t) is also split into a frequency component having sum frequency $(f_1+f_2)$ and a frequency component having difference frequency $(f_1-f_2)$.

Receiving part 12 contains an I mixer 32, a Q mixer 34, and a receiving amplifier 36, whose input is connected to an antenna 38. Antenna 38 may optionally be identical to antenna 24 (monostatic antenna concept), if the received signal is separated from the transmission signal with the aid of a circulator, for example.

The radar radiation emitted from antenna 24 is reflected on an object 40, and the radar echo thus generated is received by antenna 38 and, after amplification in amplifier 36, supplied as received signal E to I and Q mixers 32 and 34. Received signal E has a frequency shift in relation to transmission signal S, which is a function of the relative velocity of object 40 (Doppler effect) and, if the transmission signal is frequency modulated, also the signal runtime and therefore the distance of object 40.

Received signal E is mixed in I mixer 32 with a first comparison signal $V_1$, which (for example, with the aid of a coupler (not shown in greater detail)) is picked up from the high-pass output of duplex mixer 22, i.e., is identical to transmission signal S (homodyne mixing concept). At the output of I mixer 32, an I signal $I_{BB}$ is thus obtained, whose frequency is in a so-called baseband and is equal to the frequency difference between received signal E and comparison signal $V_1$. The frequency of this I signal therefore specifies the frequency shift of the radar echo. In Q mixer 34, received signal E is mixed with a second comparison signal $V_2$, which is supplied from the high-pass output of duplex mixer 32. This comparison signal $V_2$ therefore has sum frequency $f_1+f_2$, but is phase shifted by 90° in relation to first comparison signal $V_1$ due to the action of phase shifter 26. A Q signal $Q_{BB}$ is thus obtained at the output of the Q mixer, which is also in the baseband and has the same frequency as I signal $I_{BB}$. Phase $\phi$ of the radar echo may be determined in a downstream analysis stage from the I and Q signals:

$$\phi = \arctan(I_{BB}/Q_{BB}).$$

Oscillators 16, 18 unavoidably have a certain phase noise. However, since comparison signals $V_1$ and $V_2$ are formed in the same way as mixed products from the signal of both oscillators, the phase noise of second comparison signal $V_2$ is correlated with the phase noise of first comparison signal $V_1$, so that this phase noise does not represent a noticeable source of interference during the further analysis of I and Q signals $I_{BB}$, $Q_{BB}$.

However, a certain phase error may arise in that the phase shift generated by phase shifter 26 is not exactly 90°. The radar sensor proposed here offers the possibility, however, of determining and optionally correcting this phase error. For this purpose, an I reference signal $I_{ref}$ is formed at the output of the low-pass part of duplex mixer 22, whose frequency is equal to difference frequency $f_1-f_2$. A Q reference signal $Q_{ref}$ is correspondingly formed at the output of the low-pass part of duplex filter 30, which also has difference frequency $f_1-f_2$. The phase difference between the I and Q reference signals represents the phase error generated by phase shifter 26. These reference signals may thus be used for the determination and correction of the phase error and/or for further suppression of the phase noise. Various possibilities for this purpose are illustrated hereafter on the basis of FIGS. 2 and 3.

Figure 2:
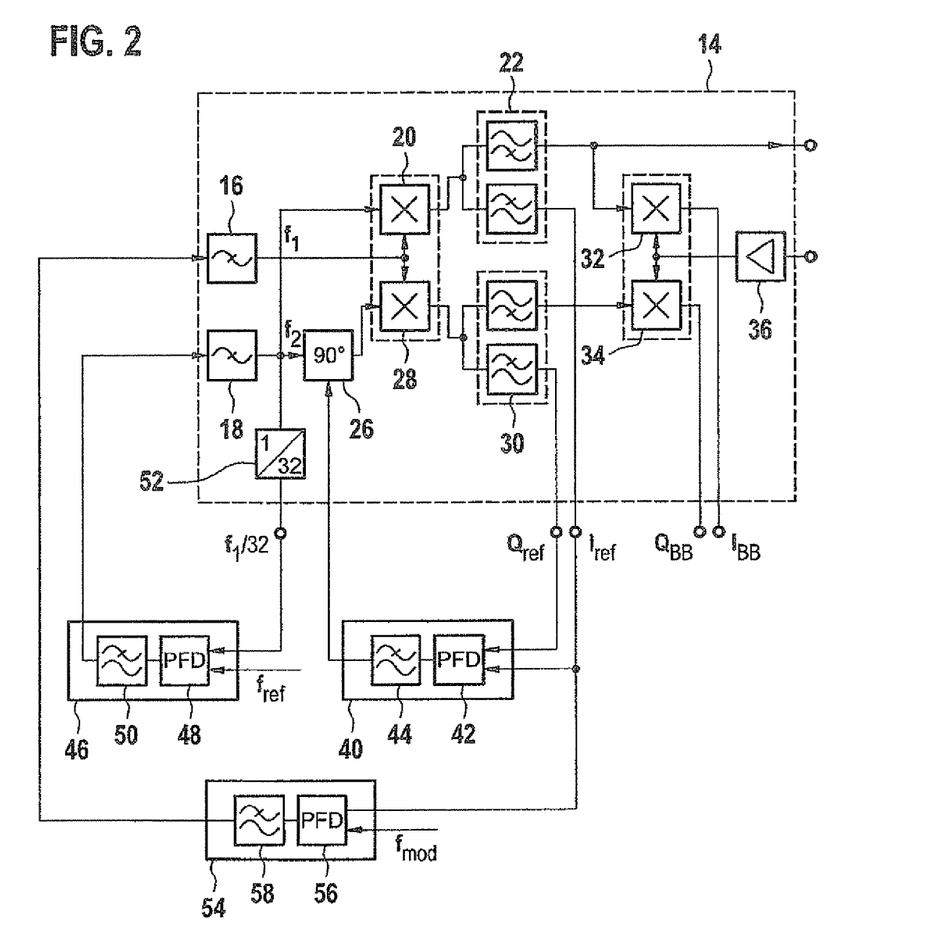
FIG. 2 shows a block diagram of a refinement of the radar sensor according to FIG. 1.

FIG. 2 initially shows a phase-locked loop 40, which has a phase comparator 42 and a downstream low-pass filter 44. Phase comparator 42 compares the phases of I and Q reference signals $I_{ref}$, $Q_{ref}$. The comparison result is supplied, after low-pass filtering in low-pass filter 44, to phase shifter 26 as a control signal. In this way, phase shifter 26 may be continuously controlled in such a way that deviations of the phase shift from the ideal value of 90° are suppressed. It is essential that the I and Q reference signals have a comparatively low frequency (2 GHz in this example), so that their phases may be sufficiently precisely determined and compared.

Furthermore, a frequency closed-loop 46 is shown in FIG. 2, which is also formed by a phase comparator 48 and a downstream low-pass filter 50. A reference signal $f_{ref}$, which is generated by a frequency-stable reference oscillator and is 1/32 of desired frequency $f_2$ of second oscillator 18, is supplied to an input of phase comparator 48. A signal, which is generated from the output signal of second oscillator 18 in that its frequency $f_2$ is divided in the ratio 1/32 with the aid of a frequency divider 52, is supplied to the other input of phase comparator 48. Second oscillator 18 is a variable-frequency oscillator in this case, to which the comparison result is supplied after low-pass filtering in low-pass filter 50 as a control signal. In this way, frequency $f_2$ of second oscillator 18 is continuously controlled in such a way that it is exactly 32 times reference frequency $f_{ref}$.

An essential advantage here is that frequency $f_2$ of second oscillator 18 is only half of transmission frequency $f_1+f_2$, so that a frequency division in the ratio 1/32 is sufficient to obtain a sufficiently low frequency for a precise phase comparison in phase comparator 48. If frequency $f_1$ of first oscillator 16 is known, transmission frequency $f_1+f_2$ may also be determined with high precision. Difference frequency $f_1-f_2$ may optionally be monitored on the basis of the I or Q reference signal, in order to determine $f_1$ on the basis of difference frequency $f_1-f_2$ and stabilized frequency $f_2$.

If first oscillator 16 is also variable, the frequency of the transmission signal may be modulated in a very simple way using a (modulation) frequency closed-loop 54. For this purpose, a low-frequency signal, whose frequency $f_{mod}$ is modulated in the desired way (for example, in the case of an FMCW radar, using a frequency modulation according to a linear ramp), is applied to an input of a phase comparator 56, which compares the phase of this signal to the phase of I reference signal $I_{ref}$ applied to the other input. The comparison result is supplied to oscillator 16 as a control signal via a low-pass filter 58. In this way, frequency $f_1$ of first oscillator 16 is controlled in such a way that frequency $f_1-f_2$ of the I reference signal is kept in coincidence with $f_{mod}$. It follows from $f_1-f_2=f_{mod}$ that:

$$f_1=f_2+f_{mod}$$

and for the frequency of transmission signal E:

$$f_1+f_2=2f_2+f_{mod}.$$

Figure 3:
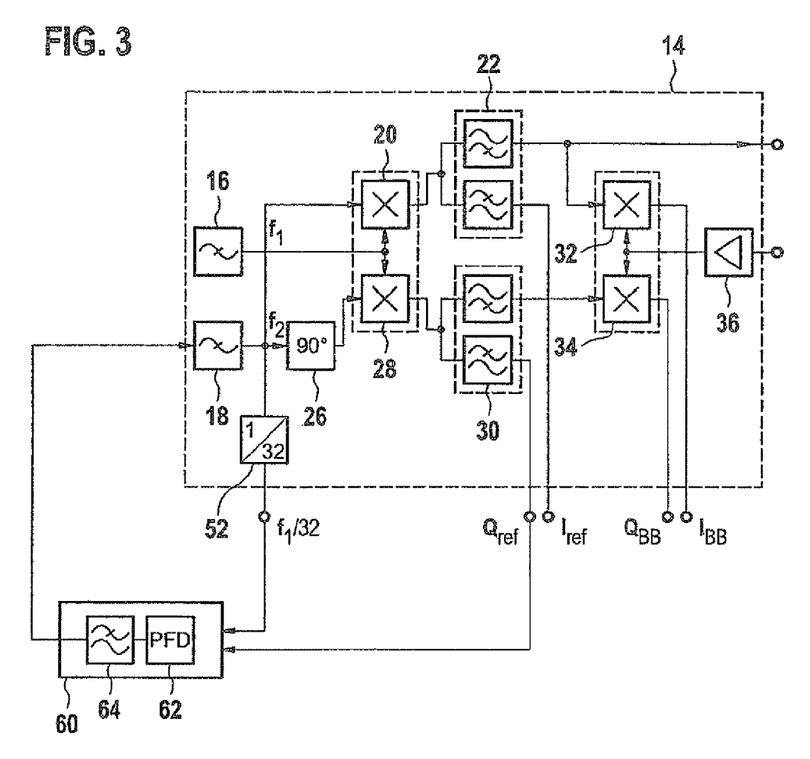
FIG. 3 shows a block diagram for a further variant of the radar sensor according to FIG. 1.

FIG. 3 illustrates a variant in which Q reference signal $Q_{ref}$ is used for the purpose of reducing the phase noise of the oscillator system. Q reference signal $Q_{ref}$ results by mixing the signal of first oscillator 16 with the signal of phase shifter 26, which is phase shifted by 90°, in second transmit mixer 28 and has frequency $f_1-f_2$. Its phase therefore reflects the phase noise of both oscillators and any possible phase errors of phase shifter 26. In the example considered here, $f_1$ and $f_2$ are selected in such a way that their difference $f_1-f_2$ is exactly 1/32 of $f_2$. In a phase-locked loop 60, the phase of the Q reference signal is compared to the signal of second oscillator 18, which is divided in frequency in the ratio 1/32, and the comparison result is supplied via a low-pass filter 64 to second oscillator 18 as a control signal. The phase noise is clearly suppressed in this way.

If the frequency of one oscillator is halved, in general a reduction of the phase noise by 6 dB results at the output of the frequency divider. Since the frequency is divided in the ratio $1/32$ ($1/2^5$) in frequency divider 52, an arithmetical reduction of the phase noise by approximately 30 dB results.

Figure 4:
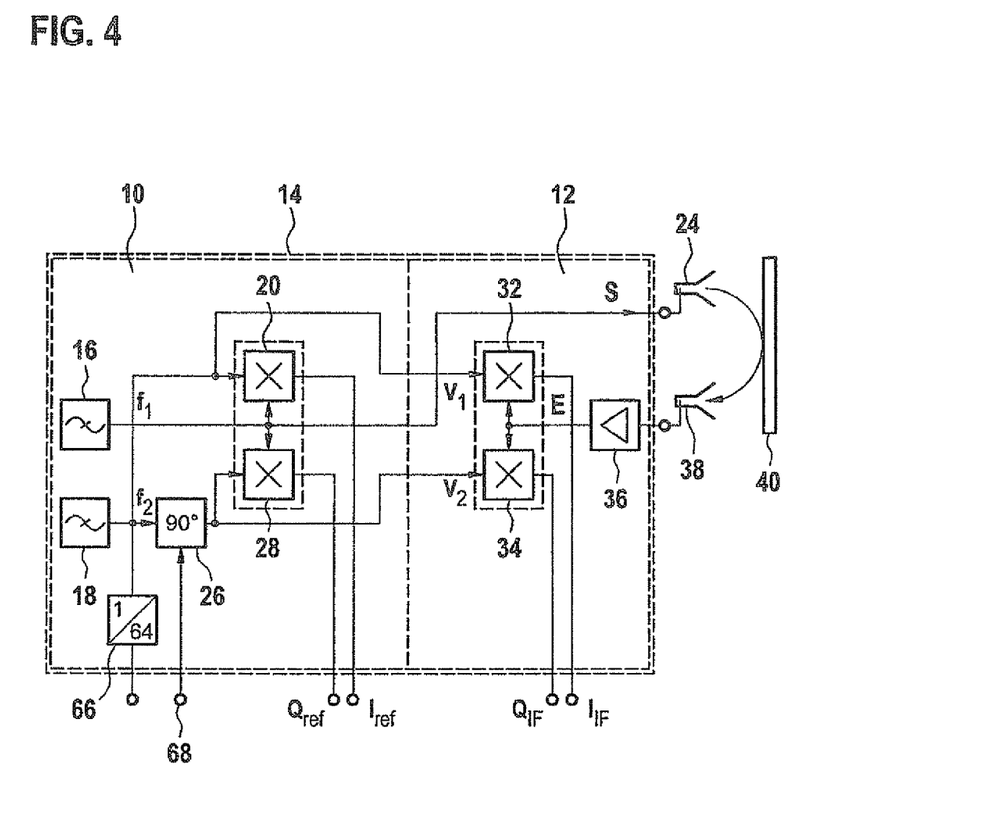
FIG. 4 shows a block diagram of a radar sensor according to a second exemplary embodiment.

FIG. 4 shows a radar sensor as a further exemplary embodiment, which is configured as a heterodyne sensor. The signal of first oscillator 16 directly forms transmission signal S, while first comparison signal $V_1$ is formed by the signal of second oscillator 18 and second comparison signal $V_2$ is formed by the signal of second oscillator 18, which is phase shifted by 90° in phase shifter 26. As an example, it may be assumed that first oscillator 16 has a frequency of 122 GHz (transmission frequency), while second oscillator 18 has a frequency $f_2$ of 120 GHz. I and Q mixers 32, 34 provide I and Q signals $I_{IF}$ and $Q_{IF}$ in this case, which are in an intermediate frequency band and have a frequency in the magnitude of approximately 2 GHz.

Transmit mixers 20 and 28 mix transmission signal S with comparison signals $V_1$ and $V_2$ (the expression "transmit mixer" is used solely to differentiate between mixers of transmitting part 10 and receiving part 12 and does not necessarily mean that these mixers also participate in generating the transmission signal or the comparison signals). Reference signals $I_{ref}$ and $Q_{ref}$ obtained as mixed products are in the intermediate frequency band and have frequency $f_1-f_2=2$ GHz.

The I and Q reference signals may be used in a similar way as in the above-described exemplary embodiment. For example, a frequency divider 66, which divides frequency $f_2$ of second oscillator 18 in the ratio 1/64, allows a suppression of the phase noise similarly as in the case of phase-locked loop 60 in FIG. 3. A regulating input 68 for phase shifter 26 is also provided, so that the phase shift may be controlled in a similar way as using phase-locked loop 40 in FIG. 2.

Since transmission signal S and comparison signals $V_1$ and $V_2$ are generated here by different oscillators, the phase noise of the comparison signals is not correlated with the phase noise of the transmission signal, which results in corresponding noise effects in I and Q signals $I_{IF}$ and $Q_{IF}$. However, the I and Q reference signals contain the same noise effects, since they result by mixing the transmission signal with the same comparison signals. The phase noise of I and Q signals $I_{IF}$ and $Q_{IF}$ is thus correlated with the phase noise of I and Q reference signals $I_{ref}$ and $Q_{ref}$, and if these signals are mixed with one another, in order to obtain corresponding I and Q signals in the baseband, the errors caused by the phase noise are largely eliminated, and the phase of the radar echo may be determined with high precision. Optionally, I and Q signals $I_{IF}$ and $Q_{IF}$ may also be compared directly to associated reference signals $I_{ref}$ and $Q_{ref}$ in order to determine the phase difference.

Figure 5:
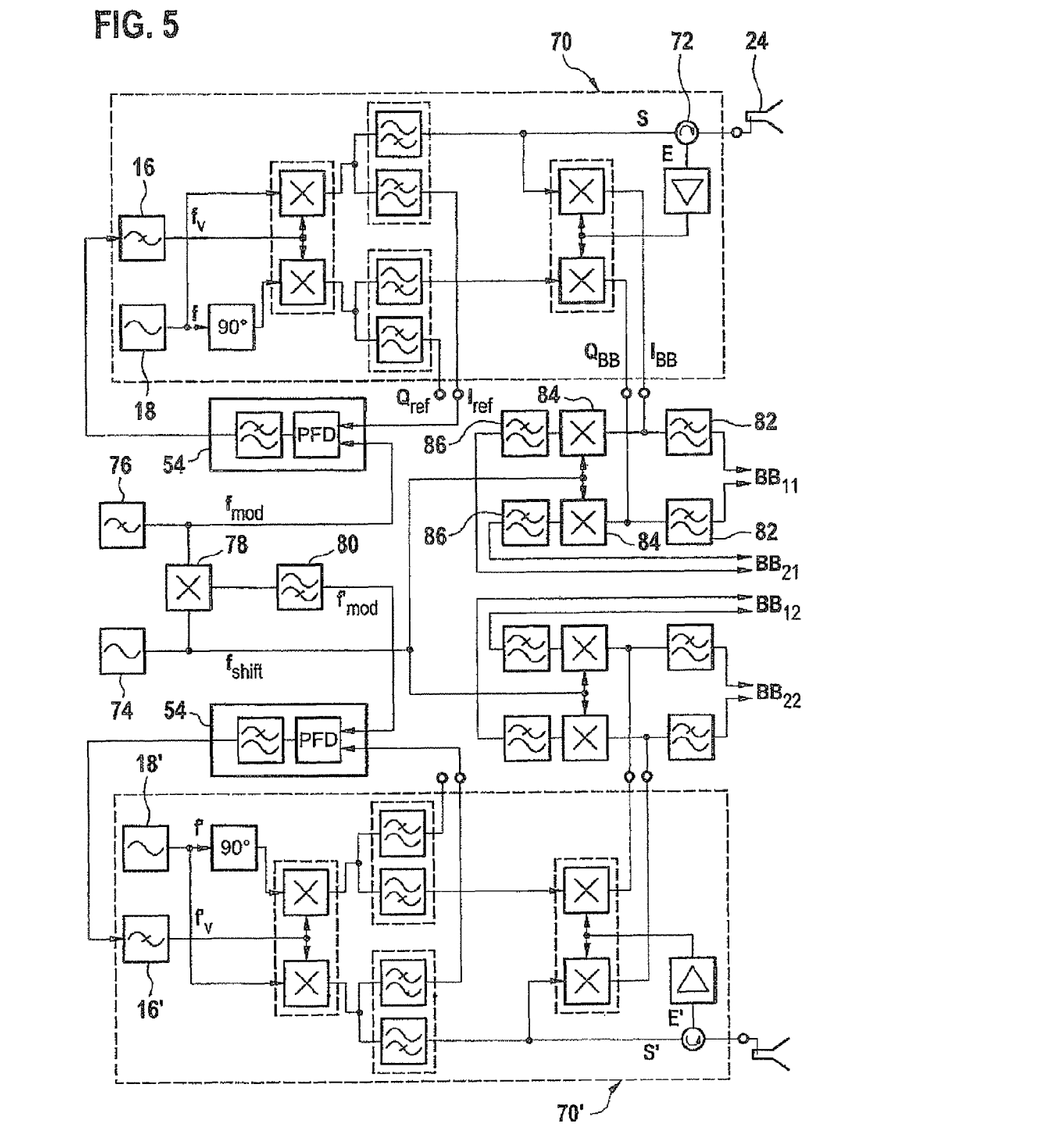
FIG. 5 shows a block diagram of a radar sensor having two transmitting and receiving channels.

FIG. 5 illustrates the application of transmitting and receiving parts using the configuration in a radar sensor having multiple transmitting and receiving channels shown in FIG. 2. For the sake of simplicity, only two channels 70, 70' are shown in FIG. 5, whose transmitting and receiving parts are each on a printed circuit board; however, the principle shown here may be readily expanded to radar sensors having more than two channels. The configuration of the transmitting and receiving parts in FIG. 5 differs from the configuration in FIG. 2 solely in that a monostatic antenna concept is implemented in FIG. 5 and accordingly a circulator 72 is provided for the purpose of separating received signal E from transmission signal S.

Transmission signals S and S' in both channels 70, 70' have frequencies which are shifted against each other by a fixed frequency $f_{shift}$. Frequency $f_{shift}$ is generated by a fixed frequency oscillator 74. In addition, both transmission signals S and S' are synchronously frequency modulated. For this purpose, a variable oscillator 76 generates modulation frequency $f_{mod}$.

Modulation frequency $f_{mod}$ is supplied directly to frequency closed-loop 54 in channel 70, in order to lock the frequency generated by variable oscillator 16 (identified here by $f_v$) with modulation frequency $f_{mod}$. First oscillator 16 generates a fixed frequency f. Sum frequency $f+f_v$ of transmission signal S is therefore modulated in the way predefined by $f_{mod}$.

In contrast, frequency $f_{mod}$ is not supplied directly to frequency closed-loop 54 in second channel 70', but rather frequency $f_{mod}+f_{shift}$, which is obtained in that the signals of oscillators 74 and 76 are mixed in a mixer 78 and then filtered in a high-pass filter 80.

For the sake of simplicity, it should initially be assumed that frequency f' which second oscillator 18 generates in second channel 70' is identical to frequency f of the second oscillator in first channel 70. The frequencies of transmission signals S and S' only differ by frequency $f_{shift}$ and additionally have identical frequency modulation.

In first channel 70, I and Q signals $I_{BB}$ and $Q_{BB}$, after low-pass filtering in a filter 82, directly indicate the frequency shift of the radar echo caused by the distance and the relative velocity of the object. These signals, which are in a baseband $BB_{11}$, are digitized, recorded as the time signal, and then decomposed by fast Fourier transform into a spectrum, which is then further analyzed in a known way.

Signals are also received in first channel 70, which were transmitted in second channel 70' having the frequency shifted by $f_{shift}$; however, these signals are outside baseband $BB_{11}$, so that the signals originating from other channels do not interfere with the signal analysis in this baseband $BB_{11}$.

In the configuration shown here, however, mixers 84 are provided for the purpose of mixing I and Q signals $I_{BB}$ and $Q_{BB}$ with frequency shift $f_{shift}$, so that after low-pass filtering in filter 86, signals in a baseband $BB_{21}$ are in turn obtained. These signals allow the analysis of the amplitude and phase of cross echoes, i.e., signals which were transmitted in second channel 70' and then received in first channel 70.

Second channel 70' is configured symmetrically to first channel 70. The transmission signal and the comparison signals have frequency f'+f'$_v$ here. Signals in a baseband $BB_{22}$, which represent the radar echo transmitted and received in this channel, are thus obtained in this channel, as well as signals in a baseband $BB_{12}$, which represent the cross echo transmitted in first channel 70 and received in second channel 70'.

If fixed frequencies f and f' are not precisely equal, but rather differ by a known difference frequency $f_{diff}$, the signals in baseband $BB_{11}$ and $BB_{21}$ and accordingly also the signals in baseband $BB_{22}$ and $BB_{12}$ may be correlated with one another on the basis of difference frequency $f_{diff}$, and the phase differences between the direct radar echoes and the cross echoes may thus be determined and analyzed, which arise due to the signal paths of different lengths from antenna 24 of one channel to the object and back to the antenna of the same channel and from the antenna of one channel to the object and back to the antenna of the other channel.

What is claimed is:

1. A radar sensor, comprising:
a transmitting part, which includes two oscillators and a 90° phase shifter for generating a transmission signal, a first comparison signal, and a second comparison signal, which is phase shifted by 90° with respect to the first comparison signal; and
a receiving part including an I mixer for mixing a received signal with the first comparison signal and a Q mixer for mixing the received signal with the second comparison signal;
wherein the transmitting part includes a first transmit mixer, whose inputs are directly connected to the two oscillators, and a second transmit mixer, a first of whose inputs is connected directly to a first of the two oscillators and a second of whose inputs is connected via the phase shifter to a second of the two oscillators.

2. The radar sensor of claim 1, wherein the I mixer and the Q mixer are wired as homodyne mixers.

3. The radar sensor of claim 2, wherein filters are connected downstream from each of the transmit mixers for dividing the respective mixed product into a sum frequency component and a difference frequency component, the sum frequency component of the first transmit mixer forming the transmission signal and the first comparison signal, and the sum frequency component of the second transmit mixer forming the second comparison signal, while the difference frequency components of the two transmit mixers form an I reference signal and a Q reference signal.

4. The radar sensor of claim 3, wherein there is a frequency closed-loop for regulating the frequency of the first oscillator based on a comparison of the phase of at least one of the I reference signal and the Q reference signal to the phase of a signal having a modulated frequency.

5. The radar sensor of claim 4, wherein there are multiple transmitting and receiving channels, in which the frequencies of the transmission signals are shifted against each other by a fixed frequency.

6. The radar sensor of claim 4, wherein there is a phase-locked loop for regulating the phase shift in the 90° phase shifter based on a comparison of the phases of the I reference signal and the Q reference signal.

7. The radar sensor of claim 4, wherein there is a frequency closed-loop for regulating the frequency of the second oscillator based on a comparison of the phase of a reference frequency signal to the phase of the signal of a frequency divider, which divides the frequency of the second oscillator in a fixed ratio.

8. The radar sensor of claim 4, wherein there is a phase-locked loop for regulating the phase of the second oscillator based on a comparison of the phase of at least one of the I reference signal and the Q reference signal to the phase of the signal of a frequency divider, which divides the frequency of the second oscillator in a fixed ratio.

9. The radar sensor of claim 1, wherein the I mixer and the Q mixer are wired as heterodyne mixers, and the first transmit mixer and the second transmit mixer each outputs a difference frequency component of the mixed product as an I reference signal and a Q reference signal.

10. The radar sensor of claim 1, wherein the frequencies of the first oscillator and the second oscillator are each greater than 40 GHz and differ by an absolute value which is less than 10 GHz.

11. The radar sensor of claim 1, wherein the frequencies of the first oscillator and the second oscillator are each greater than 40 GHz and differ by an absolute value which is less than 3 GHz.

* * * * *